United States Patent
Kinnari et al.

(10) Patent No.: US 7,406,738 B2
(45) Date of Patent: Aug. 5, 2008

(54) THRUSTER PIG

(75) Inventors: Keijo Kinnari, Sola (NO); Catherine Labes-Carrier, Hafrsfjord (NO); Jim Bob Crawford, Lafayette, LA (US)

(73) Assignees: Statoil ASA, Stavanger (NO); Crawford Technical Services, Inc., Lafayette, LA (US)

( * ) Notice: Subject to any disclaimer, the term of this patent is extended or adjusted under 35 U.S.C. 154(b) by 503 days.

(21) Appl. No.: 10/877,274

(22) Filed: Jun. 25, 2004

(65) Prior Publication Data

US 2005/0283927 A1    Dec. 29, 2005

(30) Foreign Application Priority Data

Jun. 24, 2004    (NO) ................................. 20042655

(51) Int. Cl.
    *B08B 9/055*    (2006.01)
(52) U.S. Cl. ................. 15/3.5; 15/104.061; 15/104.067
(58) Field of Classification Search ............ 15/104.067, 15/3.5, 104.061; 166/311–312, 77.1, 77.2; 405/154.1, 184
    See application file for complete search history.

(56) References Cited

U.S. PATENT DOCUMENTS

| | | | |
|---|---|---|---|
| 4,216,738 A | 8/1980 | Muta ............................ | 118/72 |
| 5,244,505 A | 9/1993 | Allison et al. ............. | 134/22.11 |
| 5,695,009 A * | 12/1997 | Hipp ........................... | 166/196 |
| 6,122,791 A | 9/2000 | Baugh et al. ........... | 15/104.061 |
| 6,250,387 B1 | 6/2001 | Carmichael et al. ......... | 166/311 |
| 6,260,617 B1 | 7/2001 | Baugh et al. ............. | 166/241.3 |
| 6,315,498 B1 | 11/2001 | Baugh et al. ................ | 405/184 |
| 6,343,657 B1 | 2/2002 | Baugh et al. ................ | 166/383 |
| 6,651,744 B1 | 11/2003 | Crawford ..................... | 166/311 |
| 6,719,050 B2 * | 4/2004 | Longacre ..................... | 166/265 |
| 6,776,231 B2 | 8/2004 | Allen .......................... | 166/173 |
| 7,025,142 B2 | 4/2006 | Crawford ..................... | 166/311 |

* cited by examiner

*Primary Examiner*—Shay L Karls
(74) *Attorney, Agent, or Firm*—Baker Botts L.L.P.

(57) ABSTRACT

A thruster pig for sending through a pipe from an entrance facility to a receiving location, for servicing or monitoring, by pumping a thrusting fluid into the pipe to force the pig forward is disclosed. The thruster pig includes a body having a front end and a back end, where the back end includes a reaction surface to which said the thrusting fluid applies a motive force. The body is slightly smaller in diameter than the inner diameter of the pipe. The pig also includes a seal circumferentially arranged on the pig to seal between said body and said pipe. A desired differential pressure is maintained over the pig to urge said pig forward through the pipe by pumping a fluid into the annulus between the pipe and the return flow line while returning fluid through said return flow line utilizing connected servicing or monitoring equipment. A connector releasably connects a return flow line to the pig. The connector includes a shifting mandrel that may be activated to open the connector by a ball pumped through the return flow line, where the ball is retained in the return flow line after releasing the connector. A blanking device is then provided to blank the bore within the pig that is left after the return flow line is disconnected.

19 Claims, 1 Drawing Sheet

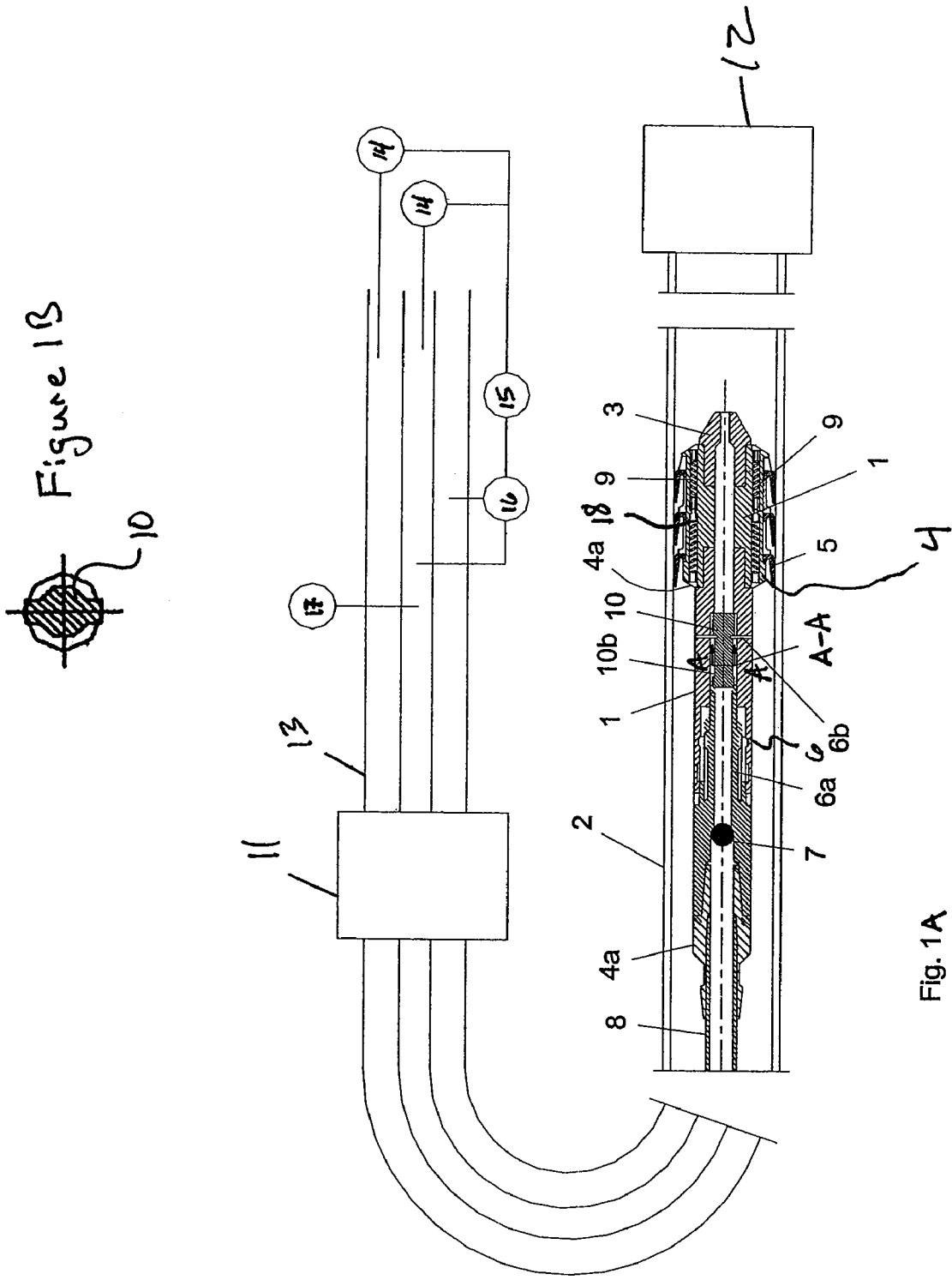

THRUSTER PIG

RELATED APPLICATIONS

This application claims the benefit of Norwegian Patent Application No. NO20042655 entitled "Thruster Pig" filed on Jun. 24, 2004.

The present application is related to U. S. patent application Ser. No. 7,279,052 entitled "Method for Hydrate Plug Removal" which claims the benefit of Norwegian Patent Application No. NO20042654 filed on Jun. 24, 2004.

TECHNICAL FIELD

The present invention relates to thruster pigs for servicing a pipeline, well or open hole to remove deposits or blocking in form of hydrates, ice, scale or debris, or for undertaking control or monitoring such as non-destructive examination. More particularly, the present invention relates to a thruster pig system that incorporates a return flow line.

BACKGROUND OF THE INVENTION

Pigs are currently available in many designs for many operations for diverse industries. Pigs can be passively flowing with the flow in a pipeline, without external connection, or the pig can be connected to, for example a line, a pipe or coiled tubing. Such a connection is usually used for withdrawing the pig. A description of pig technology can be found in U.S. Pat. No. 6,651,744 B1 entitled "Bi-Directional Thruster Pig Apparatus and Method of Utilizing Same" which is considered the closest prior art to the present invention. Relevant background art is also described in U.S. Pat. No. 6,315,498 B1 entitled "Thruster Pig Apparatus For Injecting Tubing Down Pipelines"; U.S. Pat. No. 6,122,791 entitled "Retrievable Pig"; U.S. Pat. No. 6,343,657 B1 entitled "Method of Injecting Tubing Down Pipelines"; and U.S. Pat. No. 6,260,617 B1 entitled "Skate Apparatus for Injecting Tubing Down Pipelines". The above-identified patents are incorporated herein by reference.

A thruster pig is urged into a pipe by pumping a fluid into the pipe at a location behind the pig such that the pig is pushed further into the pipe by said pressurized fluid. If the pipe bore is completely blocked with, for example, hydrates, only a thruster pig system with a return flow line or flow way is useful, since fluid ahead of the pig must be taken out to avoid pressure buildup against the blockage. Thruster pigs having a separate flow line connected have so far been designed with connections and flow line both for fluid flow delivery or return, as well as for withdrawing both the coiled tubing and the connected pig. The separate flow line often consists of coiled tubing.

The insertion and withdrawal of pigs connected to coiled tubing become more difficult as the injection length of the pig and coiled tubing increases, the number of bends increases, and the extent of horizontal or upwards sloping sections in the pipe increases. Such difficulties limit the usability of thruster pigs.

Particularly in the oil and gas industry the demand for pigging operations is significant. Severe problems often occur in long subsea pipelines at large depths and in cold waters. Such problems may include hydrate formation blocking the pipelines, in addition to various deposits such as ice, wax and debris. The initially warm well fluid is cooled down by cold seawater, thereby inducing condensation, precipitation and hydrate formation. Hydrates can be melted with thermodynamic inhibitors such as MEG (glycol coolant) or methanol shifting the melting point of the hydrates to below the ambient temperature. In case of a shutdown or failure in the inhibitor injection system, severe blocking by hydrates is likely.

SUMMARY OF THE INVENTION

Therefore a demand has arisen for expanding the usability of thruster pigs. One objective of the present invention is to provide a thruster pig and a thruster pig system that meet the above identified demand.

In agreement with the objectives of the present invention, a thruster pig is provided for sending through a pipe from an entrance facility to a receiving location, for servicing or monitoring, by pumping a thrusting fluid into the pipe to force the pig forward into the pipe. The thruster pig includes a body having a front end and a back end, which back end includes a reaction surface to which said thrusting fluid applies a motive force, said body having a diameter slightly smaller than the inner diameter of the pipe. The pig also includes a seal circumferentially arranged on the pig to seal between said body and said pipe. A desired differential pressure is maintained over the pig to urge said pig forward through the pipe by pumping a fluid into the annulus between the pipe and the return flow line while returning fluid through said return flow line utilizing connected servicing or monitoring equipment. A connector releasably connects a return flow line to the pig. The connector includes a shifting mandrel that may be activated to open the connector by a ball pumped through the return flow line, where the ball is retained in the return flow line after releasing the connector. A blanking device is then provided to blank a bore within the pig that is left after the return flow line is disconnected.

At any point within the pipe, the return flow line may be disconnected from the pig. Subsequently the pig can be urged forward to a pig receiving location by pumping or directing fluid into the pipe.

For the purpose of the present disclosure, the term pipe designates any pipe, pipeline, aperture, channel, well or open bore hole of relatively uniform cross section. The term ball means a ball, a cylinder, or any object that can be transported down the return flow line to open the connection, the ball preferably being retained in the return flow line. The term servicing includes removal of any hydrates, ice, scale, wax or solid debris by integrating and using appropriate equipment or tools. The term monitoring includes, for example, wall thickness measurements with ultrasound or electromagnetic equipment, or examination for crack detection, by integrating and using prior art equipment. Preferably, said equipment is modular, comprising, for example, a power module, sensor module and data storage module, such that long cables are avoided and data can be collected when the pig is retrieved from the pig receiving location.

The thrusting fluid conveniently comprises coolant to melt hydrates and ice at ambient pipe conditions, such that a separate coolant line may be omitted. The coolant used may be any glycol, methanol or other inhibitor or coolant or mixture thereof with hydrocarbons, water or other liquid, providing capability for melting hydrates and ice at ambient pipe conditions. The pig body is slightly smaller than the smallest pipe dimension, and the seal provides significant flexibility with respect to diameter variation in addition to increased reaction surface for the thrusting fluid.

The return flow line may be any pipe or sections of pipes, rigid or flexible as convenient. However, the return flow line is preferably coiled tubing, which may include tubing of metal, composites, reinforced polymers or any material and design providing capability of winding the tubing on a spool, where the spool preferably includes a spool drive. Preferably the coiled tubing is dimensioned for retrieval without the pig connected thereto. This provides for significant cost savings because the coiled tubing can be of a lighter and weaker design with respect to stress applied in the longitudinal direction, as the tubing will not typically be used to retract the pig. The maximum length the pig can be injected by thrusting into a particular pipeline is also increased since a longer length of coiled tubing can be retrieved.

The thruster pig of the invention preferably includes a blanking device in the form of a blanking plug arranged to be set when the shifting mandrel is activated. In a preferred embodiment a blanking plug with an external fishing neck is included to facilitate retrieval by a fishing tool. Thereby enlarged reaction surface area and motive force is also achieved. Further, the thruster pig may advantageously comprise a blanking plug that is milled almost flat to allow circulation when in place, such that circulation can pass in either direction until the blanking plug is activated.

Preferably the thruster pig of the invention includes a hydrate removal tool, in form of channels extending through the body of the pig and connected with nozzles at the front end of the pig, to jet the inner surface and interior of the pipe in front of the pig. The channels open at an adjustable set pressure to pass coolant from the back end of the pig through the pig to the nozzles and jet the surface and interior of the pipeline in front of the pig with coolant. The thrusting fluid preferably comprises coolant, such that a separate coolant line is unnecessary. Fluid comprising coolant, pieces of hydrates and debris, etc, from ahead of the pig, is then retrieved as return flow by the return flow line. Means are preferably arranged for control of the return fluid composition, such that the coolant contents is sufficient to avoid hydrate or ice formation. Such means may be instrumentation, a sample collection facility or, for example, a spool piece with window for visual inspection.

A pump is preferably installed topside in or near the end of the return flow line, to pump out fluid from the return flow line in order to achieve an appropriate differential pressure between the fluid pumped into the annulus behind the pig and the fluid ahead of the pig, thereby controlling the urging of the pig through the pipe. Equipment for pressure control may preferably include a differential pressure transmitter providing signal for differential pressure between the return flow line and the annulus to a pressure controller controlling the operational pressure of the pumps connected to the annulus and return flow line, respectively. Hence, the control of the motive force and displacement is improved.

For a blocked pipe, the pig can be pushed out of the pipe by reversing the flow by pumping fluid into the return flow line, said fluid applying force on a reaction surface on the front end of the pig, and optionally urged by carefully tensioning the return flow line.

This method of removing the pig by reverse flow or fishing operations, and the normal disconnection of the coiled tubing results in a simpler and more reliable thruster pig verses previously designed pigs.

The thruster pig of the present invention may include apertures, opening at a preset adjustable pressure, arranged between volumes of different operating pressure, preferably of a two way design as described in U.S. Pat. No. 6,651,744 B1. Preferably an aperture is provided also in between the coiled tubing and the surrounding annulus, thereby providing, increased protection against excessive pressure.

A thruster pig system is also provided for sending a pig through a subsea pipe from an entrance facility to a receiving location to perform hydrate removal by pumping a thrusting fluid into the pipe to force the pig forward into the pipe while hydrate removal is undertaken continuously or intermittently. The thruster pig system includes a pump for pumping thrusting fluid and a return flow line, including means for handling the return flow line. A working platform or vessel on the surface includes a tube having means and length for connecting the tube from the platform to the pipe. The system also includes a thruster pig with the return flow line connected to the tube from the platform to the pipe. The thruster pig includes a body having a front end and a back end, where the back end includes a reaction surface to which thrusting fluid may apply a motive force, the body has a diameter slightly smaller than the inner diameter of the pipe and the tube.

The pig also includes a seal circumferentially arranged on the pig to form seal between the body and the pipe. A hydrate removal tool is further incorporated in the pig in the form of channels and nozzles arranged to jet the inner surface and interior of the pipe in front of the pig.

A connector for releasable connection of the return flow line to the pig is also included where the connector includes a shifting mandrel that may be activated to open the connector by pumping a ball down the return flow line. The ball may be retained in the return flow line after opening the connector and a blanking device may be arranged to blank the bore left in the pig as the return flow line is disconnected.

The thruster pig is urged forward by pumping thrusting fluid into the annulus between the tube and the return flow line while returning fluid through said return flow line as required to maintain a desired differential pressure over the pig. At any point within the pipe the return flow line may be disconnected from the pig and retrieved to the platform and the blanked pig can be urged forwards to a pig receiving location by pumping or directing fluid into the pipe. The thrusting fluid is preferably MEG or methanol, hence a separate coolant pipe is avoided.

The return flow line preferably includes coiled tubing arranged onto a single spool or several spools of connectable lengths, with an integrated spool drive dimensioned to retrieve the full length of injected coiled tubing when the pig is disconnected.

The thruster pig system with coiled tubing is a particularly preferred embodiment of the present invention. The construction results in significant cost savings due to reduced weight of coiled tubing, and lighter spool drive system (for example hydraulic constant tension) and dimensioning topsides, in addition to improved operability and lowered risk.

Some of the distinguishing aspects of the present invention over previous systems include the omission of obligatory apertures or passageways through the pig, a connector that is releasable by pumping a ball or similar element down the coiled tubing thereby opening the connector while the ball is retained in the coiled tubing, the blanking device, the return flow line and associated equipment with weaker dimensioning, the means for pressure control and the means for return fluid control.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein FIG. 1A is an cross-sectional, side view of an embodiment of a thruster pig according to the present invention. FIG. 1B is a cross-sectional end view of a blocking device of the thruster pig shown in FIG. 1A taken at line A-A.

DETAILED DESCRIPTION OF THE INVENTION

Preferred embodiments of the invention and its advantages are best understood by reference to FIGS. 1 wherein like numbers refer to like and corresponding parts. The present invention is complimentary to related now U.S. Pat. No. 727, 9052 entitled "Method for Hydrate Plug Removal" which is incorporated by reference, herein.

Reference is made to FIG. 1 that is an illustration of an embodiment of a thruster pig according to the present invention.

The thruster pig 1, which may also be referred to as a "pig", is illustrated in a longitudinal section of a pipeline 2. Thruster pig 1 has a body 18 with a front end 3 and a back end 4. Back end 4 includes reaction surfaces 4a to which thrusting fluid may apply a motive force. The body 18 has a diameter slightly smaller than the inner diameter of the pipe. Thruster pig 1 includes seals 5 circumferentially arranged on pig 1 to form a seal between the body 18 and pipe 2. In the illustrated embodiment three seals 5 are arranged. Further, thruster pig 1 includes a connector 6 for releasably connecting with a return flow line 8 in the form of coiled tubing to pig 1.

In the present embodiment, connector 6 includes a shifting mandrel 6a that is activated to open connector 6 by pumping a ball 7 through coiled tubing 8 such that ball 7 is retained in the coiled tubing 8 after opening connector 6. The line of disconnection is designated with reference numeral 6b. Further, thruster pig 1 includes a blanking device 10 arranged to blank a bore left as coiled tubing 8 is disconnected. FIG. 1A also includes a cross-section of blanking device 10, viewed in cross-section taken at line A-A indicated in FIG. 1A. When pumping in ball 7, ball 7 engages at the illustrated location and the fluid within the coiled tubing 8 pushes shifting mandrel 6a forward thus activating the disconnection to disconnect coiled tubing 8 at line of disconnection 6b at blanking plug 1 which may also be referred to as a "blanking device" or as a "blank". Ball 7 is retained at the engagement location by a retaining means (not expressly shown) blocking the further passage of ball 7 and designed such that ball 7 preferably applies pressure on shifting mandrel 6a when fluid is pumped into coiled tubing 8. At an adjustable differential pressure of, for example, five bar over the ball 7 the disconnection is made.

Blanking device 10 and the connection are interconnected such that blanking plug 10 cannot be set before the disconnection has been made. Upon disconnection blanking device 10 is set and the bore, as shown in FIG. 1B, is blocked, for example by a spring back action as the connection is disconnected. A fishing neck 10b will be left exposed after disconnecting the coiled tubing, such that in case a fishing operation contrary to what is expected ever should be required, said fishing operation is facilitated.

Also illustrated on FIG. 1 are channels 9 through which thrusting fluid including inhibitor can be directed. The bores and nozzles for jetting the inner surface and interior of the pipe in front of the pig may incorporate any appropriate channels or apertures opening at a preset, adjustable pressure, arranged between the front and back ends of the pig, such as those described and illustrated in U.S. Pat. No. 6,651,744 B1.

Thruster pig 1 is provided for sending through a pipe 2 from an entrance facility 11 to a receiving location 12, for servicing or monitoring, by pumping a thrusting fluid into the pipe to force the pig 1 forward into pipe 2. A desired differential pressure is maintained over pig 1 to urge said pig forward through pipe 2 by pumping a fluid into the annulus between pipe 2 and return flow line 8 while returning fluid through return flow line 8 utilizing connected servicing or monitoring equipment. The servicing and monitoring equipment may include one or more pumps 14, pressure control equipment 15, and a differential pressure transmitter 16 for maintaining a desired pressure differential across pig 1. Additionally, suitable equipment 17 may be included to control the composition of fluid. Tube 13 is also preferably provided to transport return fluid line 8 between a surface vessel (not expressly shown) and entrance facility 11.

Although the present invention and its advantages have been described in detail, it should be understood that various changes, substitutions and alternations can be made herein without departing from the spirit and scope of the invention as defined by the following claims.

What is claimed is:

1. A thruster pig for sending through a pipe from an entrance facility to a receiving location by pumping a thrusting fluid into the pipe to force the pig forwards into the pipe, said thruster pig comprising:
   a body having a front end and a back end, the back end including a reaction surface to which said thrusting fluid applies a motive force, said body having a diameter smaller than the inner diameter of the pipe;
   a seal circumferentially arranged on the pig operable to form a seal between the body and the pipe;
   a connector operable to releasably connect a return flow line to the pig, the connector including a shifting mandrel operable to activate upon the connector by pumping a ball through the return flow line, the ball being retained in the return flow line after opening the connector;
   a blanking device arranged to blank a bore left in the thruster pig as the return flow line is disconnected;
   the thruster pig operable to be urged forward through the pipe by the maintenance of a differential pressure over the pig by pumping a fluid into an annulus between the pipe and the return flow line while returning fluid through the return flow line; and
   the return flow line operable to be disconnected from the pig and retrieved from the pipe, wherein the thruster pig with the blanking device therein is operable to be urged forward to a pig receiving location by directing fluid into the pipe, wherein the blanking device comprises a blanking plug arranged to be set when the shifting mandrel is activated.

2. The thruster pig of claim 1 wherein the return flow line comprises coiled tubing.

3. The thruster pig of claim 2 further comprising the coiled tubing dimensioned for retrieval from the pipe after disconnection from the thruster pig.

4. The thruster pig of claim 1, wherein the blanking device further comprises an external fishing neck operable to facilitate retrieval by a fishing tool.

5. The thruster pig of claim 1, further comprising the blanking device milled flat to allow circulation around the blanking device when not engaged with the bore.

6. The thruster pig of claim 1, further comprising a hydrate removal tool including at least one channel each associated with a nozzle at the front end of the pig, the nozzle operable to jet the interior surface of the pipe in front of the thruster pig.

7. The thruster pig of claim 6, further comprising pressure control equipment arranged including a differential pressure transmitter providing signal for differential pressure between the return flow line and the annulus to a pressure controller controlling the operational pressure of pumps connected to the annulus and return flow line, respectively.

8. The thruster pig of claim 1, further comprising a pump in communication with the return flow line operable to pump fluid from the return flow line in order to achieve an appropriate differential pressure between the fluid pumped into the annulus behind the thruster pig and the fluid ahead of the thruster pig, thereby controlling the urging of the thruster pig through the pipe.

9. The thruster pig of claim 1, further comprising one or more apertures operable to open at a preset, adjustable pressure.

10. The thruster pig of claim 1, further comprising means associated with the return fluid line operable to control the return fluid composition.

11. A thruster pig system for sending a thruster pig through a subsea pipe from an entrance facility to a receiving location for removing hydrates by pumping a thrusting fluid into the pipe to force the pig forward within the pipe, the thruster pig system comprising:
   a pump for pumping thrusting fluid;
   a return flow line in communication with a thruster pig, including means for handling the return flow line disposed on a working platform;
   a tube having means and length for connecting the tube from the platform to the subsea pipe, the tube operable to send the thruster pig having the return flow line connected thereto through the tube from the platform to the pipe; the thruster pig comprising:
   a body having a front end and a back end, the back end including a reaction surface to which the thrusting fluid applies a motive force, the body having a diameter smaller than the inner diameter of the pipe;
   a seal circumferentially arranged on the thruster pig to seal between the body and the pipe;
   a hydrate removal tool, including channels for coolant in communication with nozzles at the front end of the thruster pig, the nozzles arranged to jet the inner surface of the pipe in front of the thruster pig;
   a connector for releasably connecting the return flow line to the thruster pig, the connector including a shifting mandrel operable to activate to open the connector by pumping a ball element down the return flow line, the ball element being retained in the return flow line after activating open the connector;
   a blanking device arranged to blank a bore left as the return flow line is disconnected;
   the thruster pig and any connected servicing or monitoring equipment operable to be urged forward through the pipe by the maintenance of a differential pressure over the pig by pumping a fluid into an annulus between the pipe and the return flow line while returning fluid through the return flow line; and
   the return flow line operable to be disconnected from the pig and retrieved from the pipe, wherein the pig with the blanking device therein is operable to be urged forward to a pig receiving location by directing fluid into the pipe.

12. The thruster pig system of claim 11, wherein said thrusting fluid comprises MEG.

13. The thruster pig system of claim 11 wherein the thrusting fluid comprises methanol.

14. The thruster pig system according to claim 11, further comprising the channels having an adjustable set pressure opens to pass coolant from the back end to the nozzles.

15. The thruster pig system according to claim 11, wherein the return flow line includes a means to control the contents of coolant in the return flow.

16. The thruster pig system according to claim 11, wherein the return flow line comprises coiled tubing arranged onto a single spool having an integrated spool drive dimensioned to retrieve the full length of injected coiled tubing when the thruster pig is disconnected from the return flow line.

17. The thruster pig system of claim 11 comprising the thruster pig operable to continuously remove hydrate from the pipe.

18. The thruster pig system of claim 11 comprising the thruster pig operable to intermittently remove hydrate from the pipe.

19. A thruster pig for sending through a pipe from an entrance facility to a receiving location by pumping a thrusting fluid into the pipe to force the pig forwards into the pipe, said thruster pig comprising:
   a body having a front end and a back end, the back end including a reaction surface to which said thrusting fluid applies a motive force, said body having a diameter smaller than the inner diameter of the pipe;
   a seal circumferentially arranged on the pig operable to form a seal between the body and the pipe;
   a connector operable to releasably connect a return flow line to the pig, the connector including a shifting mandrel operable to activate upon the connector by pumping a ball through the return flow line, the ball being retained in the return flow line after opening the connector;
   a blanking device arranged to blank a bore left in the thruster pig as the return flow line is disconnected;
   the thruster pig operable to be urged forward through the pipe by the maintenance of a differential pressure over the pig by pumping a fluid into an annulus between the pipe and the return flow line while returning fluid through the return flow line; and
   the return flow line operable to be disconnected from the pig and retrieved from the pipe, wherein the thruster pig with the blanking device therein is operable to be urged forward to a pig receiving location by directing fluid into the pipe,
   wherein the blanking device further comprises a spring back action that sets the blanking plug upon disconnection of the return flow line from the pig.

* * * * *